(12) United States Patent
Kawamoto

(10) Patent No.: US 6,243,500 B1
(45) Date of Patent: Jun. 5, 2001

(54) IMAGE PROCESSING APPARATUS AND METHOD FOR ERASING DIRTY SPOTS IN REPRODUCING SYSTEMS

(75) Inventor: Hiroyuki Kawamoto, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/161,225

(22) Filed: Sep. 28, 1998

(30) Foreign Application Priority Data

Sep. 26, 1997 (JP) .................................................... 9-262208

(51) Int. Cl.$^7$ ...................................................... H04N 1/40
(52) U.S. Cl. .............................................. 382/275; 358/1.9
(58) Field of Search .................................... 382/275, 260, 382/261–263, 264, 265; 358/1.9

(56) References Cited

U.S. PATENT DOCUMENTS

| | | | |
|---|---|---|---|
| 5,283,671 | * 2/1994 | Stewart et al. | 358/532 |
| 5,341,192 | * 8/1994 | Wally, Jr. et al. | 355/50 |
| 5,594,807 | * 1/1997 | Liu | 382/128 |
| 5,687,006 | * 11/1997 | Namizuki et al. | 358/462 |
| 5,838,833 | * 11/1998 | Ishikawa et al. | 382/249 |
| 5,892,852 | * 4/1999 | Namizuka et al. | 382/254 |

OTHER PUBLICATIONS

English Translation of Abstract of Japanese Patent No. 07030751–A, dated Jan. 31, 1995.

* cited by examiner

Primary Examiner—Thomas D. Lee
Assistant Examiner—Stephen Brinich
(74) Attorney, Agent, or Firm—Oblon, Spivak, McClelland, Maier & Neustadt, P.C.

(57) ABSTRACT

An image processing apparatus which processes image data either in a character image reading mode or a character/photo mixed-image reading mode. The apparatus includes an MTF filter that emphasizes the image data, a smoothing filter that smooths the image data, a memory that stores white data, a mesh-screen image judging device that judges whether the image data is a mesh-screen image in the character image reading mode and the character/photo mixed-image reading mode, and an isolated-pixel judging device that judges whether the image data is an isolated-pixel. A first selection device selects an output of the MTF filter when the isolated-pixel judging device judges the image data to be a non-isolated-pixel and selects the white data when the isolated-pixel judging device judges the image data to be an isolated-pixel, when the mesh-screen image judging device judges the image data to be a non-mesh-screen image. A second selection device selects an output of the first selection device when the mesh-screen image judging device judges the image data to be a non-mesh-screen image and selects an output of the smoothing filter when the mesh-screen image judging device judges said image data to be a mesh-screen image.

6 Claims, 13 Drawing Sheets

FIG. 4
EXAMPLE OF MATRIX CONSTRUCTION

| D00 | D10 | D20 | D30 | D40 |
|-----|-----|-----|-----|-----|
| D01 | D11 | D21 | D31 | D41 |
| D02 | D12 | D22 | D32 | D42 |
| D03 | D13 | D23 | D33 | D43 |
| D04 | D14 | D24 | D34 | D44 |

FIG. 5

EXAMPLE OF MTF FILTER CONSTRUCTION

| 0 | 0 | −1 | 0 | 0 |
|---|---|---|---|---|
| 0 | −1 | −2 | −1 | 0 |
| −1 | −2 | +16 | −2 | −1 |
| 0 | −1 | −2 | −1 | 0 |
| 0 | 0 | −1 | 0 | 0 |

FIG. 6

EXAMPLE OF SMOOTHING FILTER CONSTRUCTION

| 1 | 1 | 1 | 1 | 1 |
|---|---|---|---|---|
| 1 | 1 | 1 | 1 | 1 |
| 1 | 1 | 2 | 1 | 1 |
| 1 | 1 | 1 | 1 | 1 |
| 1 | 1 | 1 | 1 | 1 |

FIG. 7

MATRIX FOR ISOLATION POINT REMOVING

| D40 | D30 | D20 | D10 | D00 |
|-----|-----|-----|-----|-----|
| D41 |     |     |     | D01 |
| D42 |     | D22 |     | D02 |
| D43 |     |     |     | D03 |
| D44 | D34 | D24 | D14 | D04 |

FIG. 9

| d02 | d12 | d22 |
|-----|-----|-----|
| d01 | p   | d21 |
| d00 | d10 | d20 |

IMAGE PROCESSING APPARATUS AND METHOD FOR ERASING DIRTY SPOTS IN REPRODUCING SYSTEMS

BACKGROUND OF THE INVENTION

1. Field of the Invention

The present invention relates generally to an improved method and apparatus for erasing dirty spots in the information content of image reproducing systems including copying systems and printing systems.

2. Discussion of the Background

The present invention is related to the area of analyzing the images of documents and determining compensation filter selections to optimize the reproduction fidelity of the print. FIG. 13 illustrates a general image processing unit (IPU) 10 which has been developed for use in an image forming apparatus such as, scanners, copying machines, facsimile machines, and so forth. The IPU 10 of FIG. 13 typically adopts a mesh-screen image seek operation and an isolated-pixel seek operation in order to erase dirty spots in the image data. The mesh-screen image seek operation is to distinguish ordinary images from mesh-screen images. The mesh-screen images are typically used with images of newspapers, for example.

In a practical application, the IPU 10 is provided with two selectable image reading modes relative to the mesh-screen image seek operation. One is a character image mode and the other is a character/photo mixed-image mode. The character image mode will be used typically when the document to be read includes mainly characters and the character/photomixed-image mode will be used typically when the document to be read includes characters and images such as photos.

A mesh-screen image, such as an image of newspaper, typically appears with images to be read in the character/photo mixed-image mode but not in the character image mode. Accordingly, the mesh-screen seek operation does not need to be operable in the character image mode in a general image processing apparatus including the IPU 10 of FIG. 13.

The dirty-pixel seek operation is used to distinguish a pixel that is not at a white level and is isolated from ordinary pixels. Such a pixel (referred to as an isolated-pixel) is regarded as an undesired dirty spot on a document. Therefore, it may be desirable if such a dirty-spot is erased from the document.

For these operations, the IPU 10 is provided with a mesh-screen image seek circuit 12 and an isolated-pixel seek circuit 13. In the IPU 10, a shading correction circuit 11 corrects the image data of a document which is transmitted from a CCD (charge coupled device) 9 through a video processing unit (VPU) 10a. The image data is then applied to a plurality of circuits such as the mesh-screen image seek circuit 12, the isolated-pixel seek circuit 13, an MTF (Modulation Transfer Function) correction filter 14 and a smoothing filter 15.

The isolated-pixel seek circuit 13 judges whether each of the individual pixels of an image is surrounded by white pixels, either in the character image mode or the character/photo mixed-image mode. A pixel surrounded by white pixels is referred to as the above-described isolated-pixel. When an isolated-pixel is found, the isolated-pixel seek circuit 13 outputs an isolated-pixel signal to a selector 17.

The mesh-screen image seek circuit 12 operates only in the character/photo mixed-image mode and judges whether the image is composed of a plurality of groups of spots, or a mesh-screen image such as in newspapers. The mesh-screen image seek circuit 12 outputs a mesh-screen image signal to a selector 18, indicating the pixel being transmitted is either a mesh-screen image or an ordinary image.

The isolated-pixel seek circuit 13 uses a 5- by 5-pixel matrix, for example, as illustrated in FIG. 4, and picks up the values of a center pixel D22 and its surrounding pixels in the matrix, as illustrated in FIG. 7, and compares these values with a predetermined threshold value X. When the values of the center pixel D22 and all of the surrounding pixels in the matrix are smaller than the predetermined threshold value X, the isolated-pixel seek circuit 13 judges the center pixel D22 to be an isolated and potentially black pixel, or a potential dirty spot. At this time, the isolated-pixel seek circuit 13 outputs an isolated-pixel signal for indicating that the pixel being transmitted is either an isolated-pixel or an ordinary pixel. When the pixel being transmitted is judged to be an isolated-pixel, this pixel needs to be changed to a white pixel, so that the isolated-pixel may be erased.

The selector 17 selects the data from a white data register 16 when the pixel D22 is judged to be an isolated and potentially black pixel, or a potential dirty spot, on the basis of the isolated-pixel signal output from the isolated-pixel seek circuit 13. The selector 17 selects the correction data from the MTF correction filter 14 when the pixel D22 is judged not to be an isolated and potentially black pixel, or an ordinary image spot, on the basis of the isolated-pixel signal output from the isolated-pixel seek circuit 13.

The selector 18 selects data output from either the selector 17 or the smoothing filter 15 on the basis of the mesh-screen image signal output from the mesh-screen image seek circuit 12. In the character mode, however, the selector 18 selects only the data output from the selector 17 regardless of the mesh-screen image signal. In the character/photo mixed-image mode, the selector 18 selects the correction data output from the smoothing filter 15 when the target pixel is judged as a pixel in a mesh-screen image. Also, in the character/photo mixed-image mode, the selector 18 selects the data output from the selector 17 when the target pixel is judged as a pixel not in a mesh-screen image. The data selected by the selector 18 is applied to a γ-correction circuit 19 and then to the following circuit.

Thus, in the character mode, the image data selected is either the white data from the white data register 16 or the MTF correction data from the MTF correction filter 14, according to the isolated-pixel signal from the isolated-pixel seek circuit 13, and the smoothing filter data from the smoothing filter 15 is not selected as the image data. In the character/photo mixed-image mode, the smoothing filter data from the smoothing filter 15 is determined as the image data when the target pixel is judged as a pixel in a mesh-screen image. On the other hand, when the target pixel is judged as a pixel not in a mesh-screen image in the character/photo mixed-image mode, the white data from the white data register 16 is selected as the image data when the target pixel is judged as an isolated-pixel, and the MTF correction data from the MTF correction filter 14 is determined as the image data when the target pixel is not judged as the isolated-pixel.

That is, the IPU 10 of FIG. 13 executes only the isolated-pixel seek operation but not the mesh-screen image seek operation when in the character mode. This means that in the character mode a target pixel in a mesh-screen image may be undesirably judged as an isolated and potentially black spot, or a potential black spot, through the dirty-spot seek operation. A countermeasure for this issue is to set the predetermined threshold value X to a relatively high value for a target pixel in a mesh-screen image. However, this countermeasure has a further drawback in which a real dirty spot in a mesh-screen image might not be found and erased with such a relatively high value X.

On the contrary, if the threshold value X is set to such a value that the isolated-pixel seek operation functions on the mesh-screen image, a problem may occur in which many pixels of the mesh-screen and low contrast images may be erased. Furthermore, if the size of the matrix of FIG. 4 is made larger in order to avoid the above-mentioned problem, another problem may occur that the size of the IPU 10 may become larger as well.

Japanese Patent Laid-open Publication 7-30751/1995 discloses an image processing apparatus that attempts to prevent upsizing thereof by combining a shift register that outputs matrix data to the isolated-pixel seek circuit 13 and a shift register that outputs different matrix data to an edge separation circuit (not shown).

It is believed that there is no image processing apparatus that is capable of properly performing the dirty-spot erasing operation in the character and character/photo mixed-image modes without causing an enlargement of the unit size.

SUMMARY OF THE INVENTION

In light of the above problems, an object of the present invention is to provide an image processing apparatus that can properly perform the dirty-spot erasing operation in the character and character/photo mixed-image modes without causing an enlargement of the unit size.

These and other objects are achieved by providing a novel image processing apparatus that includes an MTF filter that emphasizes an image data, a smoothing filter that smooths the image data, a memory that stores white data, a mesh-screen image judging device that judges whether the image data is a mesh-screen image in the character image reading mode and the character/photo mixed-image reading mode, an isolated-pixel judging device that judges whether the image data is an isolated-pixel, a first selection device that selects an output of the MTF filter when the isolated-pixel judging device judges the image data to be a non-isolated-pixel and that selects the white data when the isolated-pixel judging device judges the image data to be an isolated-pixel, when the mesh-screen image judging device judges the image data to be a non-mesh-screen image; and a second selection device that selects an output of the first selection device when the mesh-screen image judging device judges the image data to be a non-mesh-screen image and that selects an output of the smoothing filter when the mesh-screen image judging device judges the image data to be a mesh-screen image.

Likewise, another image processing apparatus according to the present invention includes an MTF filter that emphasizes the image data, a smoothing filter that smooths the image data, a memory that stores white data, a mesh-screen image judging device that judges whether the image data is a mesh-screen image in the character image reading mode and the character/photo mixed-image reading mode, an isolated-pixel judging device that judges whether the image data is an isolated-pixel so as to make an isolated-pixel erasing ability strong when the mesh-screen image judging device judges the image data to be a non-mesh-screen image, and that judges whether the image data is an isolated-pixel so as to make the isolated-pixel erasing ability weak when the mesh-screen image judging device judges the image data to be a mesh-screen image, a first selection device that selects an output of the MTF filter when the isolated-pixel judging device judges the image data to be a non-isolated-pixel and that selects the white data when the isolated-pixel judging device judges the image data to be an isolated-pixel, and a second selection device that selects an output of the first selection device when the mesh-screen image judging device judges the image data to be a non-mesh-screen image and that selects an output of the smoothing filter when the mesh-screen image judging device judges the image data to be a mesh-screen image.

The novel method according to the present invention includes the steps of emphasizing the image data with an MTF filter, smoothing the image data with a smoothing filter, storing white data with a memory, judging whether the image data is a mesh-screen image in the character image reading mode and the character/photo mixed-image reading mode with a mesh-screen image judging device, judging whether the image data is an isolated-pixel with an isolated-pixel judging device, selecting an output of the MTF filter when the isolated-pixel judging device judges the image data to be a non-isolated-pixel and selecting the white data when the isolated-pixel judging device judges the image data to be an isolated-pixel, when the mesh-screen image judging device judges the image data to be a non-mesh-screen image with a first selection device, and selecting an output of the first selection device when the mesh-screen image judging device judges the image data to be a non-mesh-screen image and selecting an output of the smoothing filter when the mesh-screen image judging device judges the image data to be a mesh-screen image with a second selection device.

Likewise another novel method according to the present invention includes the steps of emphasizing image data with an MTF, smoothing the image data with a smoothing filter, storing white data with a memory, judging whether the image data is a mesh-screen image in the character image reading mode and the character/photo mixed-image reading mode with a mesh-screen image judging device, judging whether the image data is an isolated-pixel so as to make an isolated-pixel erasing ability strong when the mesh-screen image judging device judges the image data to be a non-mesh-screen image, and that judges whether the image data is an isolated-pixel so as to make the isolated-pixel erasing ability weak when the mesh-screen image judging device judges the image data to be a mesh-screen image with an isolated-pixel judging device, selecting an output of the MTF filter when the isolated-pixel judging device judges the image data to be a non-isolated-pixel and selecting the white data when the isolated-pixel judging device judges the image data to be an isolated-pixel with a first selection device, and selecting an output of the first selection device when the mesh-screen image judging device judges the image data to be a non-mesh-screen image and selecting an output of the smoothing filter when the mesh-screen image judging device judges the image data to be a mesh-screen image with a second selection device.

Other objects, features and advantages of the present invention will become apparent upon consideration of the following description of the preferred embodiments of the present invention taken in conjunction with the accompanying drawing.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is an explanatory view showing a matrix which is generated by the matrix generating circuit in FIG. 3;

FIG. 5 is an explanatory view showing a coefficient of an MTF filter in FIG. 2;

FIG. 6 is an explanatory view showing a coefficient of a smoothing filter in FIG. 2;

FIG. 7 is an explanatory view showing a judging matrix of an isolated-pixel erasing circuit in FIG. 1;

FIG. 9 is an explanatory view showing a detecting matrix of a peak value detecting section in FIG. 8;

DESCRIPTION OF THE PREFERRED EMBODIMENTS

Figure 1:
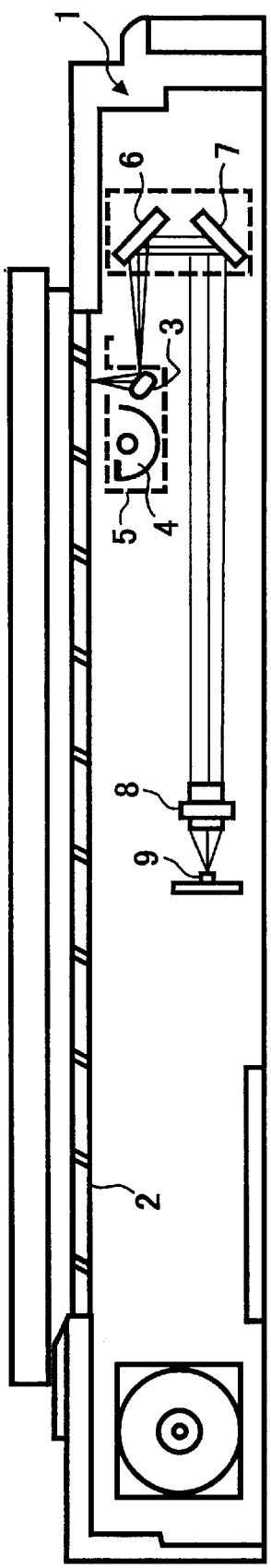
FIG. 1 is a schematic construction illustrating a digital image reading apparatus of an embodiment of an image processing apparatus according to the present invention.

An embodiment of the present invention is described in detail in the drawings, wherein like reference numerals indicate identical or corresponding parts throughout the several views.

In the reading apparatus 1 of FIG. 1, an original document (not shown) placed on a contact-glass 2 is illuminated by a light source 4. A reflection light from the original document is successively reflected by a first mirror 3, a second mirror 6, and a third mirror 7. Then, the reflected light is focused onto a surface of a CCD (charge coupled device) line image sensor 9 by a lens 8. Thereby, an image of the original document is scanned in a main-scanning direction with the CCD line image sensor 9. The scanned image is then converted into image data through a photo-to-electronic conversion. The first mirror 3 and the light source 4 are mounted on a first moving member 5a. The second mirror 6 and the third mirror 7 are mounted on a second moving member 5b. The original document on the contact-glass 2 is scanned in a sub-scanning direction by moving the first and second moving members 5a and 5b in the sub-scanning direction. The moving members 5a and 5b move at a speed ratio of 2:1.

Figure 2:
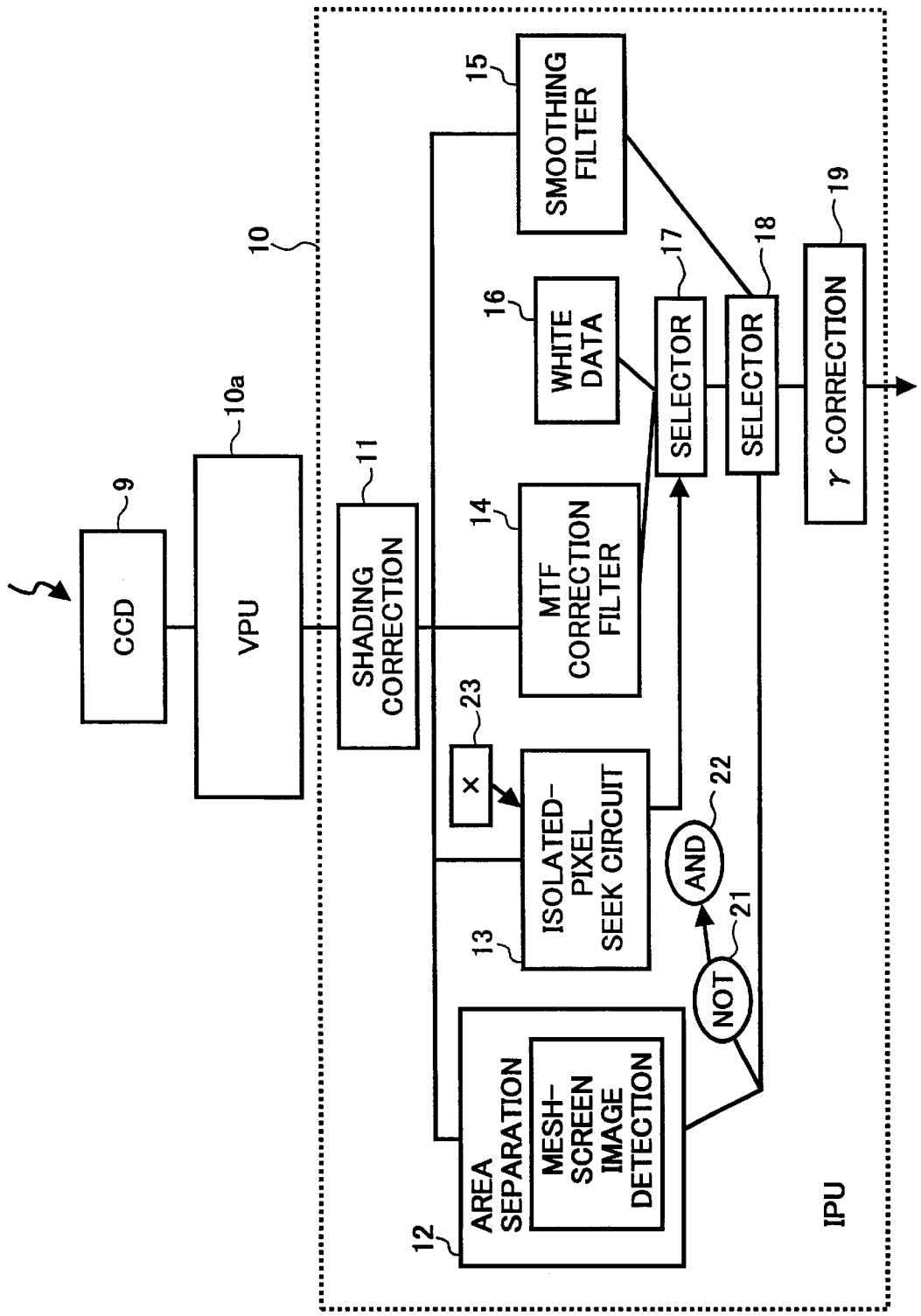
FIG. 2 is a block diagram illustrating the image processing apparatus of the digital image reading apparatus in FIG. 1.

In FIG. 2, an image signal, which is read by the CCD line image sensor 9, is applied with an appropriate gain and then converted into a digital signal, through a VPU (video processing unit) 10a. Thereby, eight-bit digital image data GDT0–GDT7, which are synchronized with a 16-MHZ pixel clock signal CLK, are generated and applied to an IPU (image processing unit) 10. In addition, the IPU 10 applies the pixel clock signal CLK and a signal CCDSTN (not shown) that determines read-out timing for the image data of the CCD line image sensor 9 to the VPU 10a.

In the IPU 10, a shading correction circuit 11 corrects the amount of light of the image data GDT0–GDT7 due to the uneven light-production of the light source 4 in a main-scanning direction and for the uneven light-receiving sensitivity of each pixel of the CCD line image sensor 9. This operation of the shading correction circuit 11 is called a shading correction. In the shading correction, the CCD line image sensor 9 reads a reference white plate that has a uniform density in a main-scanning direction before reading the image of the original document. Then, the white data of the reference white plate read by the CCD line image sensor 9 are stored pixel by pixel into a memory (not shown).

Thereafter, the CCD line image sensor 9 reads the original document and the image data GDT0–GDT7 are generated. The image data GDT0–GDT7 for each pixel are divided by the white data of the corresponding pixel stored in the memory (not shown). Then, the division result is used as the image data.

Figure 3:
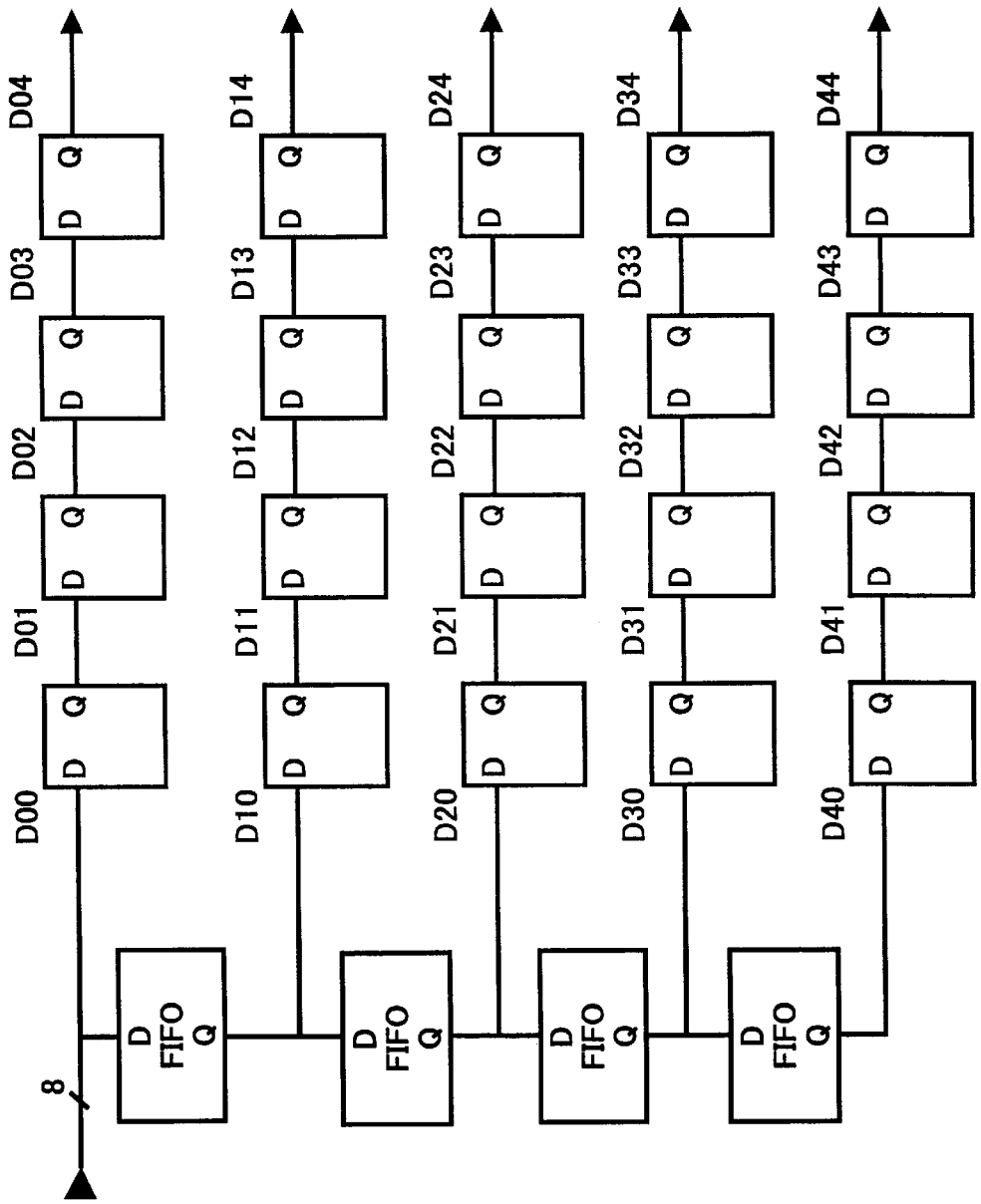
FIG. 3 is a block diagram showing a matrix generating circuit of the image processing apparatus in FIG. 1.

The image data GDT0–GDT7 that are corrected through the shading correction circuit 11 are applied to a mesh-screen image seek circuit 12, an isolated-pixel seek circuit 13, an MTF correction filter 14, and a smoothing filter 15. The MTF correction filter 14 includes, for each bit, four FIFO (first-in first-out) memories for four data lines and 4×5 D-FFs (D-type flip-flop circuits), as shown in FIG. 3, and forms a 5- by 5-pixel matrix, as shown in FIG. 4. Accordingly, the MTF correction filter 14 has 5 lines in the main scanning direction, 5 lines in the sub-scanning direction, and 8 bits in depth. The MTF correction filter 14 includes a plurality of predetermined coefficients, as shown in FIG. 5. The MTF correction filter 14 multiplies each pixel of the image data by the corresponding coefficient, and adds each multiplication result to the pixel being examined. This operation emphasizes especially high-frequency image data in order to minimize optically-made frequency characteristics. The MTF correction filter 14 then outputs the resultant image data to the selector 17.

The smoothing filter 15 forms, for each bit, a matrix of 5×5 pixels, as also shown in FIG. 4, including four FIFO (first-in first-out) memories for four lines and 4×5 D-FFs (D-type flip-flop circuits) as shown in FIG. 3. The smoothing filter 15 also includes a plurality of predetermined coefficients, as shown in FIG. 6. The smoothing filter 15 multiplies each pixel of the image data by the corresponding coefficient in a similar manner as mentioned above. Then, the smoothing filter 15 adds each multiplication result to the image data being examined, and outputs the resultant image data to a selector 18. This operation cuts high-frequency data.

The isolated-pixel seek circuit 13 forms a matrix of 5×5 pixels, as shown in FIG. 4. The isolated-pixel seek circuit 13 includes, for each bit, four FIFO (first-in first-out) memories for four lines and 4×5 D-FFs (D-type flip-flop circuits), as shown in FIG. 3, in a manner similar to that mentioned above. The isolated-pixel seek circuit 13 picks up a target pixel D22 and its surrounding pixels in the matrix, as shown in FIG. 7. Then, the isolated-pixel seek circuit 13 compares the values of the target pixel D22 and the surrounding pixels in the matrix with a predetermined threshold value X which is stored in a threshold register 23. Then, the isolated-pixel seek circuit 13 outputs an isolated-pixel signal to an AND gate 22 when the values of the target pixel D22 and all of the surrounding pixels in the matrix are smaller than the value of the threshold value X. The isolated-pixel signal indicates that the target pixel is an isolated-pixel, and is used to change the pixel to a white pixel, as described later on. Hereupon, the isolated-pixel seek circuit 13 judges the target pixel D22 and the surrounding pixels in the matrix as follows:

D44<X
and D43<X
and D42<X
and D41<X
and D40<X
and D34<X
and D30<X
and D24<X
and D22<X
and D20<X
and D14<X
and D10<X
and D04<X
and D03<X
and D02<X
and D01<X
and D00<X Furthermore, the isolation-point removing circuit 13 outputs a high signal (H) when an isolated-pixel is detected.

Figure 8:
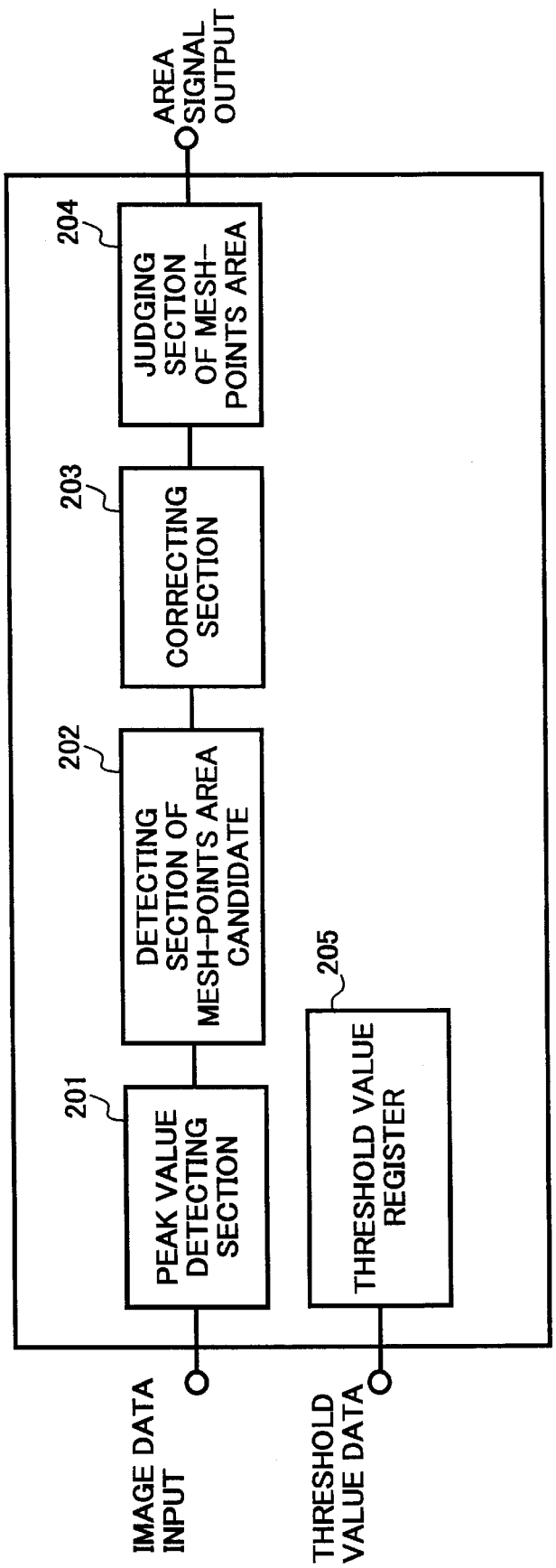
FIG. 8 is a block diagram showing a mesh-screen image seek circuit in FIG. 2, in detail.
Figure 9:
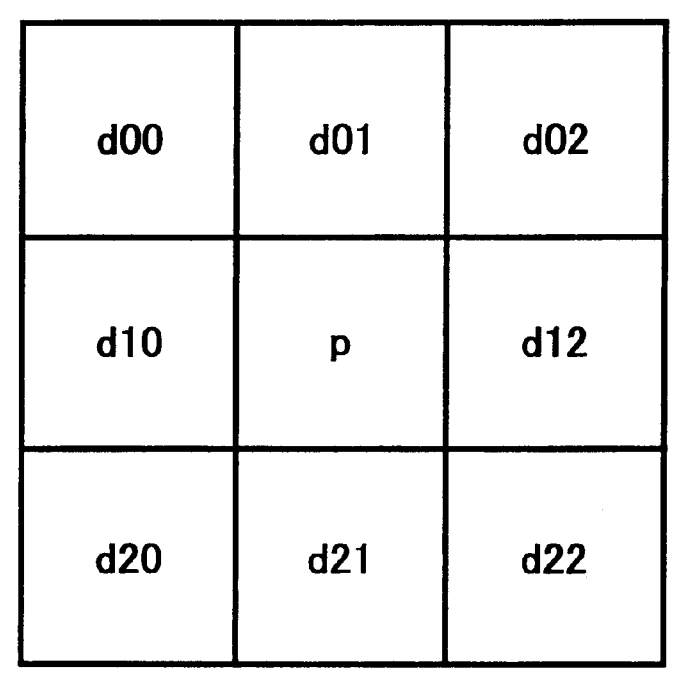

FIG. 8 illustrates a construction of the mesh-screen image seek circuit 12 in detail. A peak value detecting section 201 of the mesh-screen image seek circuit 12 analyzes density variations of the input image data and detects a peak of a crest or a trough (hereinafter called crest peak and trough peak, respectively) of the density variations. This peak value detecting operation compares the values of a target pixel and its surrounding pixels. FIG. 9 shows an exemplary 3- by 3-pixel matrix used for this operation, having a target pixel p and eight surrounding pixels d00–d22.

Crest Peak Value Detection

In the crest peak value detection, the value of the target pixel p is judged as a crest peak pixel when the following two conditions are met. One condition is that the density of the target pixel p is greater than those of the surrounding pixels d00–d22. The other condition is that a difference between the density levels of the target pixel p and a mean value of the density levels of the pixels that are symmetrically located at both sides of the target pixel D22 in diagonal, top and bottom, and right and left directions (in FIG. 9) is greater than a predetermined threshold value Y. The predetermined threshold value Y is stored in a threshold value register 205. The above-mentioned conditions are expressed by a following inequality:

P>d00 and p>d01 and p>d02
and p>d10 and p>d12
and p>d20 and p>d21 and p>d22 and
$\{2\times p-(d00+d22)\}>Y$
and $\{2\times p-(d01+d21)\}>Y$
and $\{2\times p-(d02+d20)\}>Y$
and $\{2\times p-(d10+d12)\}>Y$.

TROUGH PEAK VALUE DETECTION

In a trough peak value detection, the value of the target pixel is judged as a trough peak when the following two conditions are met. One condition is that a density of the target pixel p is smaller than the surrounding pixels d00–d22. The other condition is that a difference of the density level between the mean value of the surrounding pixels of the target pixel D22 that are symmetrically located at both sides of the target pixel D22 in diagonal, top and bottom, and right and left directions (in FIG. 9) and the value of the target pixel is greater than the threshold value Y. These conditions are expressed in the following equation:

P<d00 and p<d01 and p<d02
and p<d10 and p<d12
and p<d20 and p<d21 and p<d22 and
$\{(d00+d22)-2\times p\}>Y$
and $\{(d01+d21)-2\times p\}>Y$
and $\{(d02+d20)-2\times p\}>Y$
and $\{(d10+d12)-2\times p\}>Y$ The result of this judgement is transmitted to a potential mesh-screen image detect circuit 202. Then, the potential mesh-screen image detect circuit 202 detects a potential mesh-screen image area with a pattern matching of the peak pixels. Then, a correcting section 203 corrects the erroneous detection of the potential mesh-screen image area made through the pattern matching operation. Thereafter, a mesh-screen image determining circuit 204 extends the potential mesh-screen image area and ultimately determines the mesh-screen image area. Then, the mesh-screen image determining circuit 204 outputs the mesh-screen image signal to a NOT gate 21 and the selector 18. Hereupon, the mesh-screen image seek circuit 12 operates in both the character mode and the character/photo mixed-image mode. The image separation signal becomes H (high) at the state of mesh-screen image, and L (low) at the state of non-mesh-screen image.

Then, an output signal of the NOT gate 21 and an output signal of the isolated-pixel seek circuit 13 are logically operated on by the AND gate 22. The selector 17 selects the output signal either from the MTF correction filter 14 or from the white data register 16 in accordance with the output signal from the AND gate 22. On the other hand, the selector 18 selects the output signal either from the selector 17 or from the smoothing filter 15 in accordance with the mesh-screen image signal.

FIG. 2 shows the image processing operation of the IPU 10 in the character mode. When the mesh-screen image signal is H (high), the isolated-pixel signal is never made effective due to the AND gate 22 which does not open with the inversed signal of the isolated-pixel signal that is H (high). However, when the mesh-screen image signal from the mesh-screen image seek circuit 12 is L (low), the isolated-pixel signal becomes effective at the AND gate 22 because the mesh-screen image signal is applied to the AND gate 22 through the NOT gate 21. Then, the selector 17 selects the white data and, subsequently, the selector 18 also selects the white data. As a result, the IPU 10 erases the isolated-pixel, or the dirty spot, in the non-mesh-screen image area in the character mode.

Figure 10:
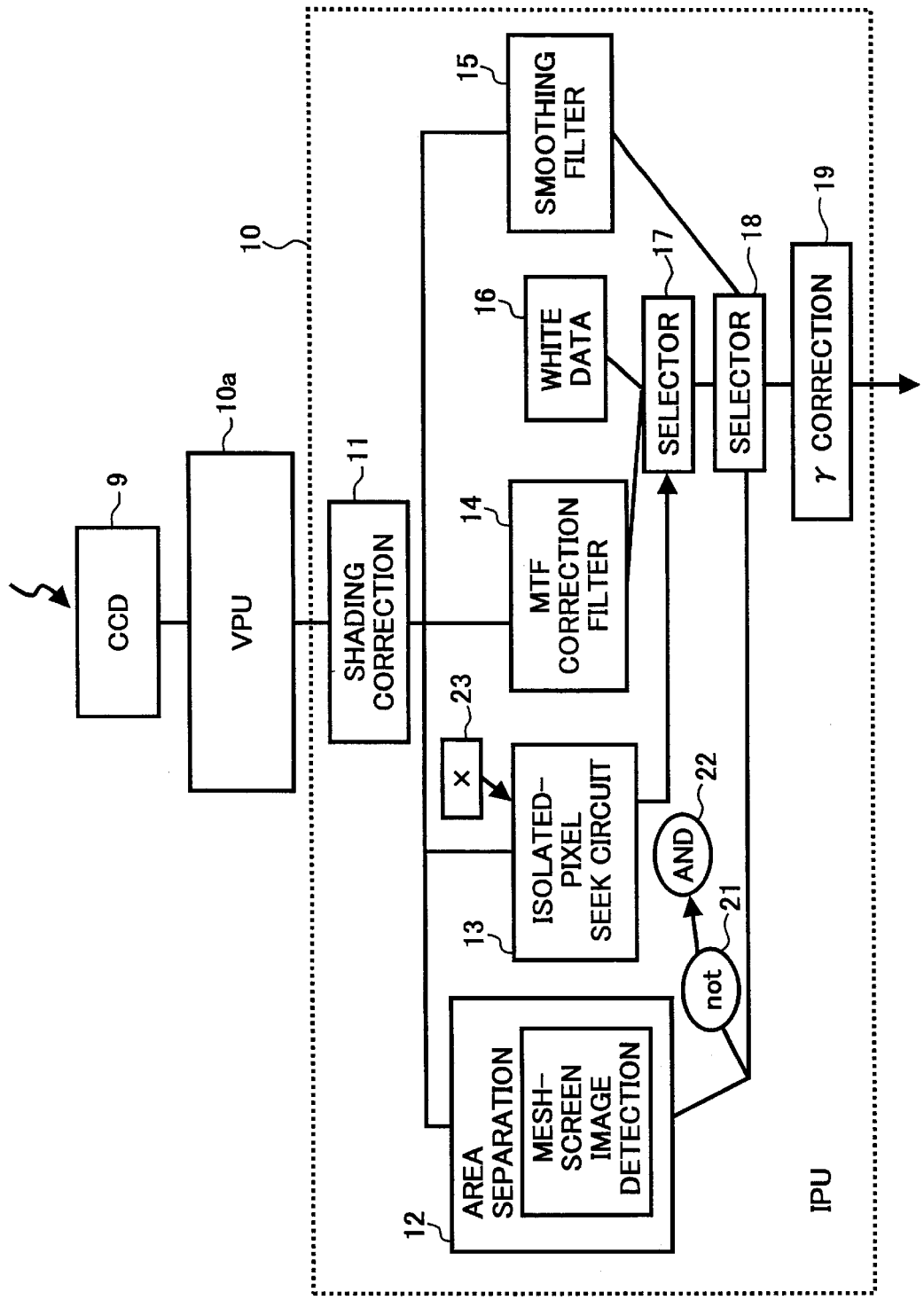
FIG. 10 is a block diagram for explaining a process in a character/photo mixed-image mode of the image processing apparatus in FIG. 2.

FIG. 10 shows the image processing process of the IPU 10 in the character/photo mixed-image mode. When the mesh-screen image signal is H (high), the output of the AND gate 22 is L (low), meaning that the pixel being examined is not the isolated-pixel, and the MTF correction data is selected by the selector 17. However, in this case, the selector 18 does not select the MTF correction data. When the mesh-screen image signal from the mesh-screen image seek circuit 12 is L (low), the isolated-pixel signal becomes effective at the AND gate 22. Then, either the MTF correction data or the white data is selected by the selector 17 on the basis of the isolated-pixel signal. The selector 18 accordingly selects the same data that the selector 17 selected.

In this way, the IPU 10 can properly perform the dirty-spot erasing operation in both the character mode and character/photo mixed-image mode without causing an enlargement of the unit size.

Figure 11:
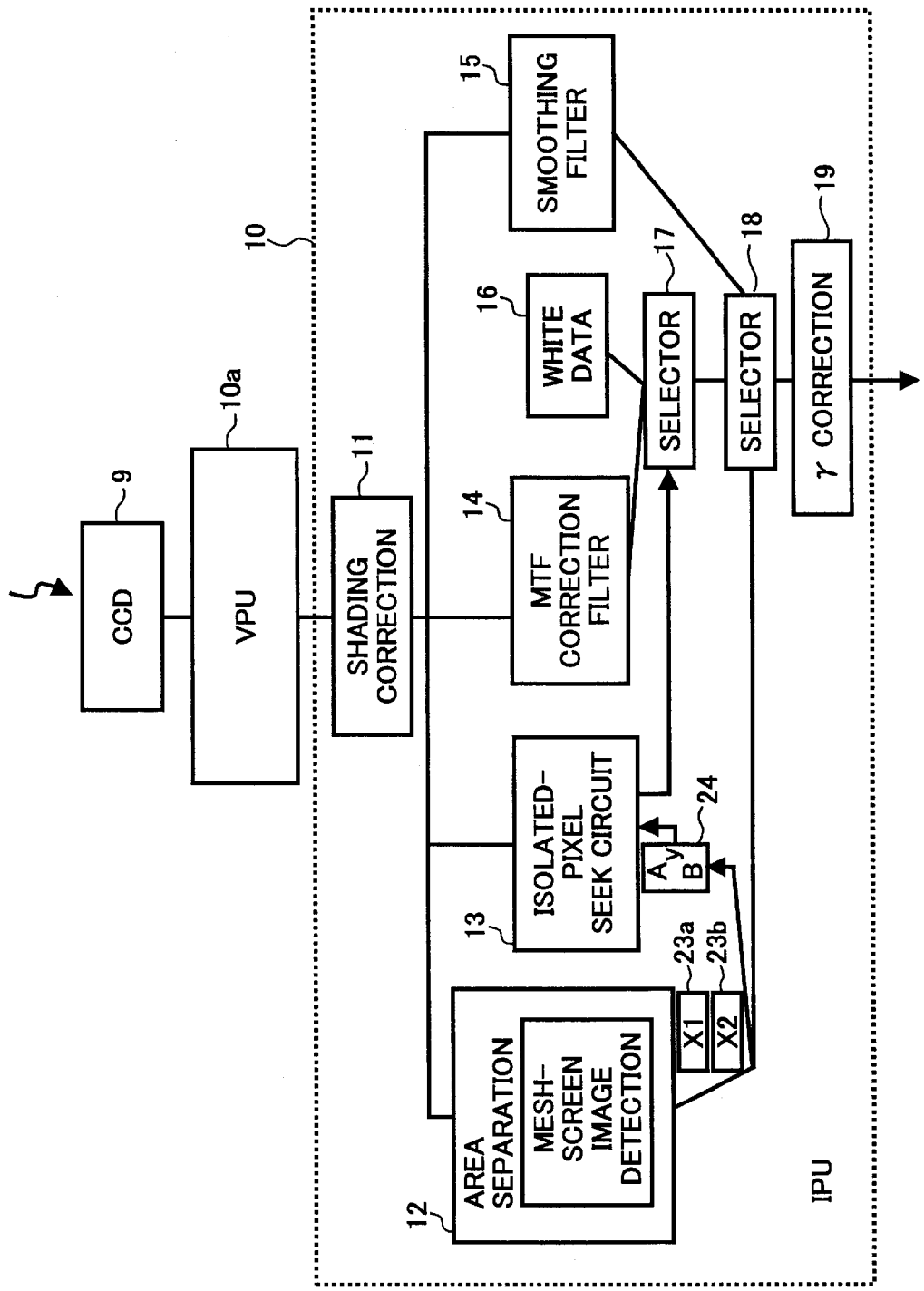
FIG. 11 is a block diagram for explaining a process in a character mode of the image processing apparatus in the modified embodiment.
Figure 12:
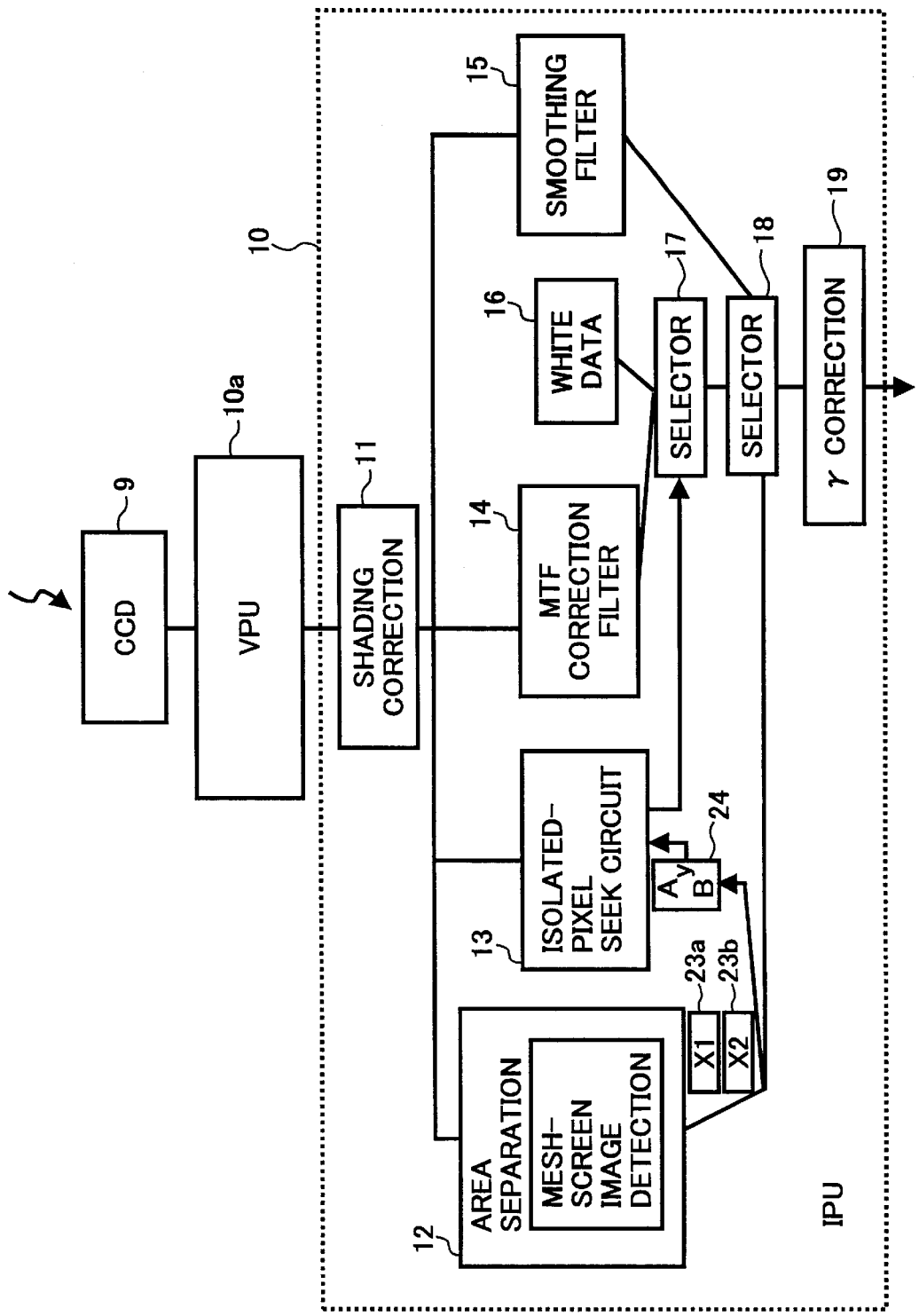
FIG. 12 is a block diagram for explaining a process in the character/photo mixed-image mode of the image processing apparatus in the modified embodiment.
Figure 13:
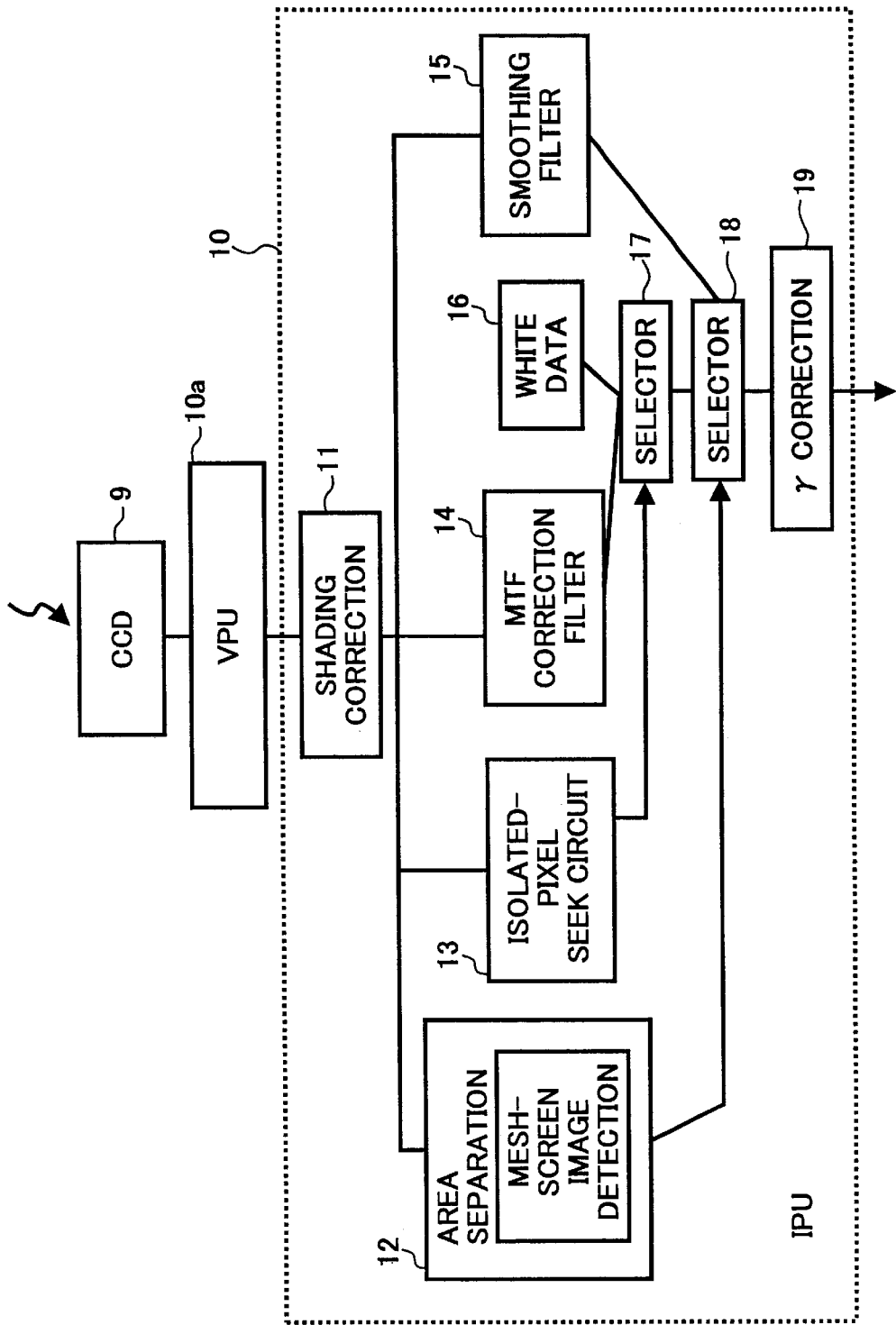
FIG. 13 is a block diagram showing the image processing apparatus of the prior art.

Next, a modified embodiment of the IPU 10 according to the present invention is explained referring to FIGS. 11 and 12. The modified embodiment is provided with threshold value registers 23*a* and 23*b*, and a selector 24 is provided instead of the aforementioned NOT circuit 21 and the AND circuit 22 in FIG. 10. The selector 24 is constructed to select a threshold value X1 (>X2) of the threshold register 23*a* on the basis of the mesh-screen image signal at a non-mesh-screen image area. The selector 24 also selects a threshold value X2 of the threshold value register 23*b* at a mesh-screen image area. The selected X1 or X2 is transmitted to the isolated-pixel seek circuit 13. This operation is to set an ordinary threshold value X1 in the isolated-pixel seek circuit 13 when the pixel is in the mesh-screen image area and an efficiently lower threshold level X2 when the pixel is in the non-mesh-screen image area. That is, the threshold value X2 needs to be such a value that a pixel in the mesh-screen image area is not erroneously judged as an isolation-pixel.

FIG. 11 shows the image processing operation of the modified embodiment of the IPU 10 in the character image mode. When the mesh-screen image signal is L (low), the threshold value X1 that strongly judges the isolated-pixel is set in the isolated-pixel seek circuit 13. When the mesh-screen image signal is H (high), the threshold value X2 that weakly judges the isolated-pixel is set in the isolated-pixel circuit 13. The selector 17 selects either the MTF correction data or the white data on the basis of the isolated-pixel signal.

FIG. 12 shows the image processing operation of the modified embodiment of the IPU 10 in the character/photo mixed-image mode. The selector 18 selects the output signal either from the selector 17 or smoothing filter 15 on the basis of the mesh-screen image signal. When the pixel is the non-mesh-screen image, the selector 18 selects the output of the selector 17. When the pixel is the mesh-screen image, the selector 18 selects the output of the smoothing filter 15. Further, the threshold value X1 that strongly judges the isolated-pixel or the threshold value X2 that weakly judges the isolated-pixel on the basis of the mesh-screen image signal is set in the isolated-pixel seek circuit 13. Then, the selector 17 selects either the MTF correction data or the white data on the basis of the isolated-pixel signal. Thereafter, the selector 18 selects the output of the selector 17, which is one of the outputs from the MTF correction data and the white data. In this way, the modified embodiment of the IPU 10 can properly perform the dirty-spot erasing operation in the character image and character/photo mixed-image modes without causing an enlargement of the unit size.

The controller of this invention may be conveniently implemented using a conventional general purpose digital computer or microprocessor programmed according to the teachings of the present specification, as is apparent to those skilled in the computer technology. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein. This application is based on Japanese patent applications JPAP09-262208 filed on Sep. 26, 1997, the entire contents of which are hereby incorporated by reference.

What is claimed as new and desired to be secured by Letters Patent of the United States is:

1. An image processing apparatus which processes image data in one of a character image reading mode and a character/photo mixed-image reading mode, said apparatus comprising:

an MTF filter which emphasizes said image data;

a smoothing filter which smooths said image data;

a memory which stores white data;

a mesh-screen image judging device which judges whether said image data is a mesh-screen image in said character image reading mode and said character/photo mixed-image reading mode;

an isolated-pixel judging device which judges whether said image data is an isolated-pixel so as to make an isolated-pixel erasing ability strong when said mesh-screen image judging device judges said image data to be a non-mesh-screen image; and which judges whether said image data is an isolated-pixel so as to make said isolated-pixel erasing ability weak when said mesh-screen image judging device judges said image data to be a mesh-screen image;

a first selection device which selects an output of said MTF filter when said isolated-pixel judging device judges said image data to be a non-isolated-pixel; which selects said white data when said isolated-pixel judging device judges said image data to be an isolated-pixel, and which produces an output; and a second selection device that selects said output of said first selection device when said mesh-screen image judging device judges said image data to be a non-mesh-screen image and which selects an output of said smoothing filter when said mesh-screen image judging device judges said image data to be a mesh-screen image.

2. Means for image processing which processes image data in one of a character image reading mode and a character/photo mixed-image reading mode, said means comprising:

means for emphasizing said image data;

means for smoothing said image data;

means for storing white data in memory;

first means for judging whether said image data is a mesh-screen image in said character image reading mode and said character/photo mixed-image reading mode;

second means for judging whether said image data is an isolated-pixel;

first selection means for selecting an output of said means for emphasizing when said second means for judging judges said image data to be a non-isolated-pixel; for selecting said white data when second means for judging judges said image data to be an isolated-pixel, when said first means for judging judges said image data to be a non-mesh-screen image; and for producing an output; and second means for selecting said output of said first means for selecting when said first means for judging judges said image data to be a non-mesh-screen image and for selecting an output of said means for smoothing when said first means for judging judges said image data to be a mesh-screen image.

3. Means for image processing which processes image data in one of a character image reading mode and a character/photo mixed-image reading mode, said means comprising:

means for emphasizing said image data;

means for smoothing said image data;

means for storing white data in memory;

first means for judging whether said image data is a mesh-screen image in said character image reading mode and said character/photo mixed-image reading mode;

second means for judging whether said image data is an isolated-pixel so as to make an isolated-pixel erasing ability strong when said first means for judging judges said image data to be a non-mesh-screen image; and for judging whether said image data is an isolated-pixel so as to make said isolated-pixel erasing ability weak when said first means for judging judges said image data to be a mesh-screen image;

first means for selecting an output of said means for emphasizing when said second means for judging judges said image data to be a non-isolated-pixel; for selecting said white data when said second means for judging judges said image data to be an isolated-pixel; and for producing an output; and a second selection means for selecting said output of said first means for selecting when said first means for judging judges said image data to be a non-mesh-screen image and for selecting an output of said means for smoothing when said first means for judging judges said image data to be a mesh-screen image.

4. A method of processing an image data in one of a character image reading mode and a character/photo mixed-image reading mode, comprising the steps of:

emphasizing image data with an MTF, smoothing said image data with a smoothing filter;

storing white data with a memory;

judging whether said image data is a mesh-screen image in said character image reading mode and said character/photo mixed-image reading mode with a mesh-screen image judging device;

judging whether said image data is an isolated-pixel so as to make an isolated-pixel erasing ability strong when said mesh-screen image judging device judges said image data to be a non-mesh-screen image; and judging whether said image data is an isolated-pixel so as to make said isolated-pixel erasing ability weak when said mesh-screen image judging device judges said image data to be a mesh-screen image with an isolated-pixel judging device;

selecting with a first selection device an output of said MTF filter when said isolated-pixel judging device judges said image data to be a non-isolated-pixel; selecting said white data when said isolated-pixel judging device judges said image data to be an isolated-pixel; and producing an output; and selecting with a second selection device said output of said first selection device when said mesh-screen image judging device judges said image data to be a non-mesh-screen image and selecting an output of said smoothing filter when said mesh-screen image judging device judges said image data to be a mesh-screen image.

5. An image processing apparatus which processes image data in one of a character image reading mode and a character/photo mixed-image reading mode, said apparatus comprising:

an MTF filter which emphasizes said image data;

a smoothing filter which smooths said image data;

a memory which stores white data;

a mesh-screen image judging device which judges whether said image data is a mesh-screen image in said character image reading mode and said character/photo mixed-image reading mode;

an isolated-pixel judging device which judges whether said image data is an isolated-pixel when said mesh-screen image judging device judges said image data to be a non-mesh image;

a first selection device which selects an output to said MTF filter when said isolated-pixel judging device judges said image data to be a non-isolated-pixel; which selects said white data when said isolated-pixel judging device judges said image data to be an isolated-pixel and said mesh-screen image judging device judges said image data to be a non-mesh-screen image, and which produces an output; and a second selection device which selects said output to said first selection device when a mesh-screen image judging device judges said image data to be a non-mesh-screen image and which selects an output to said smoothing filter when said mesh-screen image judging device judges said image data to be a mesh-screen image.

6. A method of processing image data in one of a character image reading mode and a character/photo mixed-image reading mode, comprising the steps of:

emphasizing image data with an MTF;

smoothing said image data with a smoothing filter;

storing white data with a memory;

judging whether said image data is a mesh-screen image in said character image reading mode and said character/photo mixed-image reading mode with a mesh-screen image judging device;

judging whether said image data is an isolated-pixel with an isolated-pixel judging device;

selecting with a first selection device an output to said MTF filter when said mesh-screen image judging device judges said image data to be a non-mesh-screen image and said isolated-pixel judging device judges said image data to be a non-isolated-pixel;

selecting with said first selection device an output of said white data when said mesh-screen image judging device judges said image data to be a non-mesh-screen image and said isolated-pixel judging device judges said image data to be an isolated-pixel;

selecting with a second selection device an output to said isolated-pixel judging device connecting to said first selection device when said mesh-screen image judging device judges said image data to be a non-mesh-screen image;

selecting an output to said smoothing filter when said mesh-screen image judging device judges said image data to be a mesh-screen image; and producing an output.

* * * * *